July 12, 1955 H. H. LANFERS ET AL 2,713,138
ELECTRIC MOTOR SPEED PROTECTIVE SYSTEM
Filed Sept. 24, 1951 2 Sheets-Sheet 1

Inventors.
H. H. Lanfers
B. R. ter Brugge
H. W. S. Mulder
By
Shenderoth, Lind & Ponack,
Attorneys.

Inventors.
H. H. Lanfers
B. R. ter Brugge
H. W. S. Mulder
By
Henderoth, Lind & Ponack
Attorneys.

2,713,138
Patented July 12, 1955

2,713,138

ELECTRIC MOTOR SPEED PROTECTIVE SYSTEM

Hero Harbert Lanfers, Berend Riko Ter Brugge, and Hendrik Willem Sasse Mulder, Apeldoorn, Netherlands Application September 24, 1951, Serial No. 248,086

Claims priority, application Netherlands August 9, 1951

3 Claims. (Cl. 318—464)

The invention relates to a device for switching off a driving part of a machine-plant when the driven part meets a resistance which is too large. Such devices are already known in several embodiments, e. g. as a slipping clutch, centrifugal switch and the like. When an electric motor is used as driving part, in the most cases fuses are insufficient to prevent overloading of the driving or driven part.

For instance with a conveyor for milk tins it may happen that a milk tin tilts by some reason and gets stuck, with the result that the chain breaks or other parts of the driving mechanism are damaged. The usual safety devices are too slow to prevent this and the aim of the invention is to provide a device which can be easily arranged at the suitable place and which comes very quickly into operation when the driven part gets stuck in some way or other.

According to the invention this is attained by connecting a dynamo to the driven part, which dynamo supplies the current for energizing an electromagnet, said magnet keeping the driving part connected, whereas in case of an overload and a consequent decrease of the rotation-velocity of the dynamo the magnet is not energized or energized too little, and the driving part is switched off e. g. by means of a weight or spring, or if the driving part is an electric motor the electromagnet actuates a switch in the supply-circuit of said electric motor.

Figure 1:
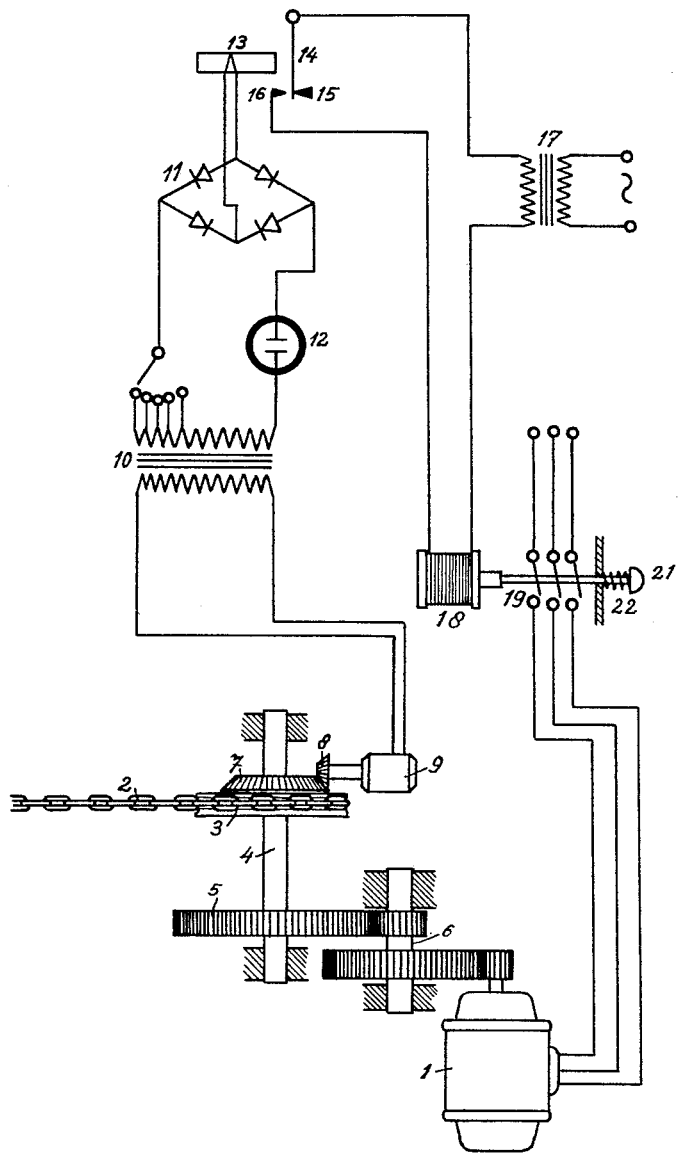
Figure 2:
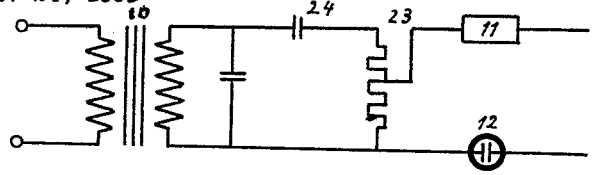
Figure 3:
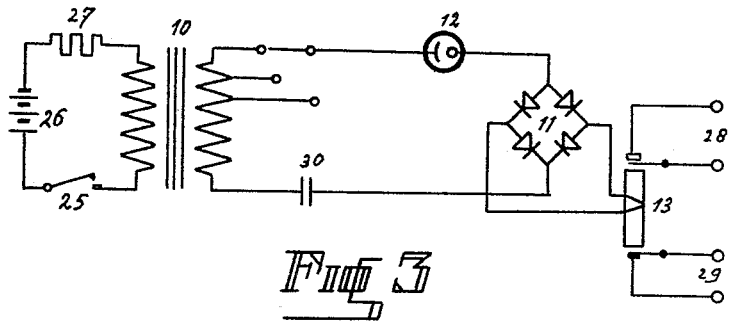

The invention will be described with reference to a number of embodiments, shown in the drawing, in which Fig. 1 shows a general embodiment, and Figs. 2 and 3 show variations thereof.

The electric motor 1 drives the shaft 4 through an intermediate shaft 6 and the toothed wheel 5. On the shaft 4 a sprocket wheel 3 is mounted, around which a conveyor chain 2' is guided. On the sprocket wheel 3 a toothed crown 7 is mounted, meshing with a toothed wheel 8 of a dynamo 9. Instead of the toothed wheel gear for the dynamo, a friction gear can be applied.

The dynamo 9 supplies the current for the energization of an electromagnet 18 controlling the switch 19 in a manner still to be described.

The switch 19 can be a normal zero-voltage switch. A spring 22 serves for switching-off the switch when the magnet 18 is not energized, a knob 21 serving for switching on and starting the motor 1.

The operation is as follows. When the conveyor is switched on the knob 21 is pressed in against the action of the spring 22 to close the switch 19, after which the motor 1 starts and the chain 2 is driven along the conveyor path.

Thereafter the knob 21 can be released since the dynamo energizes the electromagnet 18, in a manner now to be described, so that the switch is kept closed.

The dynamo 9, in this case an alternating-current dynamo, feeds a transformer 10, the secondary voltage of which can be controlled over a certain range e. g. by means of tappings. It is also possible to use a normal transformer with a potentiometer in shunt of the secondary windings.

It is also possible to provide a condenser 24 (Fig. 2) between the secondary windings of the transformer 10 and the potentiometer 23, in such a way that when the number of revolutions of the dynamo 9, and also the frequency of the alternating current delivered by said dynamo increases, the apparent resistance or reactance of the condenser 24 decreases so that the voltage across the potentiometer 23 increases.

In the secondary circuit of the transformer a rectifier 11 is provided, preferably with full-wave rectification, e. g. a Graetz bridge circuit with metal rectifiers.

In series with said device 11 a discharge tube, e. g. a neon lamp 12, is provided, and over the diagonal points of the bridge a direct current relay 13 is provided with contact arm 14, with back contact 15 and working contact 16.

In the circuit of the contact arm 14 and contact 16 a source of current, e. g. a transformer 17, is provided feeding the electromagnet 18 of the electromagnetic switch 19 in the supply circuit of the electric motor 1. Incidentally the transformer 17 can be omitted, in which case the secondary winding of said transformer is provided on the transformer 10.

The device is adjusted in such a manner that at the normal number of revolutions of the shaft 4 and consequently of the dynamo 9, the A. C. potential in the secondary circuit of the transformer 10 will be so high, that the neon lamp 12 ignites. Said potential therefore must be higher than the ignition-voltage of the neon lamp 12. The A. C. voltage is rectified by the device 11, so that relay 13 is fed by direct current, the armature 14 is pulled and contact 16 is closed. The transformer 17 then feeds the electromagnet 18, said magnet keeping the switch 19 closed against the action of the spring 22.

When owing to some circumstance the driven part of the plant gets stuck or when an undesired retardation occurs, the potential of the dynamo 9 decreases so that the secondary potential of the transformer decreases.

The adjustment is such that when a dangerous retardation occurs, said secondary potential decreases to a value, smaller than the extinguishing-voltage of the neon lamp 12 so that said lamp extinguishes. (When the driven part gets stuck the dynamo potential becomes zero so that also in this case the lamp 12 extinguishes.)

As soon as the lamp 12 extinguishes, the relay 13 is de-energized, the magnet 18 has no current and the switch 19 is released so that the motor 1 is switched off.

The switch 19 is provided with a press-button 21, which as already mentioned, is pressed during the starting cycle of the motor 1, e. g. in the interval during which the number of revolutions of the dynamo 9 is too small to ignite the lamp 12. As soon as said lamp ignites, the button 21 can be released. The device procures a fully automatic and safe protection also at fairly small retardations of the driven part such as can occur as a consequence of an undesired mechanical resistance in said driven part.

The device can also be used for protection against an abnormally high number of revolutions. In that case the secondary potential of the transformer 10 must be adjusted in such a way that at the normal number of revolutions the lamp 12 does not yet ignite, in which case both contacts 15, 16 of relay 13 are interchanged. When the number of revolutions becomes too high the circuit of the magnet 18 is interrupted so that the motor 1 is switched off. Both possibilities can be combined.

In Fig. 3 a device is shown in which the A. C. dynamo is replaced by a source of direct current, e. g. a battery. Such device can be used in running-in a motor car to prevent driving the car too quickly.

In the circuit according to Fig. 3 a driven part of the machine to be protected is provided with a rotating interruptor 25, provided in the primary circuit of the transformer 10. In said circuit a source of D. C. current e. g. a battery 26 and a preferably variable limiting resistance 27 are arranged. Said resistance prevents a short circuit in case the interruptor 25 during a longer period should be in its closed position.

The remaining part of the circuit corresponds to that of Fig. 1.

The relay 13 can be arranged in such a way that its contacts control one or more circuits 28, 29, said circuit(s) serving to control the device to be protected.

When the device is used for running-in a motor car one of the circuits 28, 29 can be connected in the primary circuit of the inductor for the ignition, so that when surpassing the maximum velocity said circuit is interrupted and the motor stops running.

For a quick control a condenser 30 can be provided in the secondary circuit of the transformer 10.

The device when used in a device according to Figs. 1 and 2 is adjusted so that at the normal number of revolutions of the rotating part the A. C. voltage in the secondary circuit of the transformer 10 is so high, that the neon lamp 12 ignites. The voltage is rectified by the rectifier 11 so that relay 13 is energized by direct current and controls the relay contacts of the circuits 28, 29.

When however, the device is used for running-in an autocar, in which case a certain maximum velocity may not be surpassed, the adjustment must be such that at said maximum velocity the neon lamp ignites, whereafter relay 13 interrupts the circuit of the electrical installation of the motor, so that the motor stops running. The frequency of the current in the secondary windings of the transformer 10 depends on the number of interruptions of the primary circuit so that said frequency is proportional to the number of revolutions of the interruptor 25.

We claim:

1. A device for switching off a driving part of a machine-plant when the driven part is subject to a resistance which is too large, comprising a dynamo coupled to the driven part, a transformer, said dynamo feeding said transformer, a discharge tube and a rectifier in series therewith in the secondary circuit of said transformer, a relay, said rectifier feeding said relay, a driving electromotor, a magnet operated switch in the supply circuit of the driving electromotor, the contacts of said relay controlling the circuit of the magnet of said switch.

2. A device as claimed in claim 1 for preventing surpassing the normal number of revolutions wherein the secondary potential of the transformer is below the ignition-voltage of said discharge tube at the normal number of revolutions, the relay when energized, interrupting the circuit of the switching magnet.

3. A device as claimed in claim 1 including a potentiometer in the secondary circuit of said transformer, said rectifier being connected with the tapping point of said potentiometer, and a condenser between one terminal of said transformer secondary and the corresponding terminal of said potentiometer.

References Cited in the file of this patent
UNITED STATES PATENTS

| | | |
|---|---|---|
| 658,117 | Parshall | Sept. 18, 1900 |
| 701,958 | Steinmetz | June 10, 1902 |
| 1,138,647 | Eckmann et al. | May 11, 1915 |
| 1,840,129 | Platzer | Jan. 5, 1932 |
| 2,071,984 | Minneci | Feb. 23, 1937 |
| 2,169,029 | Michel | Aug. 8, 1939 |
| 2,467,582 | Corkran | Apr. 19, 1949 |